United States Patent
Cai et al.

(10) Patent No.: US 9,023,251 B2
(45) Date of Patent: *May 5, 2015

(54) METHOD FOR MAKING A CARBON NANOTUBE SLURRY

(75) Inventors: Qi Cai, Beijing (CN); Duan-Liang Zhou, Beijing (CN); Peng Liu, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 819 days.

This patent is subject to a terminal disclaimer.

(21) Appl. No.: 13/210,408

(22) Filed: Aug. 16, 2011

(65) Prior Publication Data

US 2012/0267582 A1    Oct. 25, 2012

(30) Foreign Application Priority Data

Apr. 19, 2011  (CN) .......................... 2011 1 0097647

(51) Int. Cl.
*H01B 1/04* (2006.01)
*B32B 9/00* (2006.01)
*H01J 9/02* (2006.01)
*H01B 1/24* (2006.01)
(Continued)

(52) U.S. Cl.
CPC . *H01J 9/025* (2013.01); *H01B 1/24* (2013.01); *B82Y 15/00* (2013.01); *H01J 2201/30469* (2013.01); *C01B 31/0253* (2013.01); *C01B 31/0273* (2013.01); *C01B 2202/34* (2013.01); *B82Y 30/00* (2013.01); *B82Y 40/00* (2013.01); *Y10S 977/742* (2013.01); *Y10S 977/842* (2013.01); *Y10S 977/789* (2013.01); *Y10S 977/901* (2013.01)

(58) Field of Classification Search
USPC ................ 252/500–519.2; 423/445 B–447.2; 427/122, 596; 977/742, 789, 842, 901
See application file for complete search history.

(56) References Cited

U.S. PATENT DOCUMENTS

| | | | |
|---|---|---|---|
| 8,436,522 B2 * | 5/2013 | Cai et al. ........................ | 313/311 |
| 2005/0189860 A1 * | 9/2005 | Nam et al. .................... | 313/311 |

(Continued)

FOREIGN PATENT DOCUMENTS

| | | |
|---|---|---|
| CN | 1696054 | 11/2005 |
| CN | 101086939 | 12/2007 |

OTHER PUBLICATIONS

Cheong et al. ("Large area patterned arrays of aligned carbon nanotubes via laser trimming." Nanotechnology, 14, pp. 433-437, Published Feb. 14, 2003).*

(Continued)

*Primary Examiner* — Tri V Nguyen
(74) *Attorney, Agent, or Firm* — Novak Druce Connolly Bove + Quigg LLP

(57) ABSTRACT

The present disclosure provides a method for making carbon nanotube slurry. The method includes the following steps. First, a carbon nanotube array is provided on a substrate, the carbon nanotube array comprises a number of carbon nanotubes. Second, the carbon nanotube array is trimmed by a laser to obtain a trimmed carbon nanotube array comprising a plurality of trimmed carbon nanotubes having uniform lengths. Third, the trimmed carbon nanotube array is removed from the substrate to obtain the trimmed carbon nanotubes. Fourth, the trimmed carbon nanotubes are mixed with an inorganic binder and an organic carrier to obtain the carbon nanotube slurry.

17 Claims, 29 Drawing Sheets

(51) Int. Cl.
*C01B 31/02* (2006.01)
*B82Y 15/00* (2011.01)
*B82Y 30/00* (2011.01)
*B82Y 40/00* (2011.01)

(56) References Cited

U.S. PATENT DOCUMENTS

| 2006/0055074 | A1 | 3/2006 | Huang et al. | |
|---|---|---|---|---|
| 2007/0284987 | A1 | 12/2007 | Liu et al. | |
| 2009/0160799 | A1* | 6/2009 | Jiang et al. | 345/173 |
| 2009/0267000 | A1* | 10/2009 | Chen et al. | 250/492.1 |
| 2010/0041297 | A1* | 2/2010 | Jiang et al. | 445/24 |
| 2010/0301278 | A1* | 12/2010 | Hirai et al. | 252/502 |
| 2011/0241527 | A1* | 10/2011 | Cai et al. | 313/311 |

OTHER PUBLICATIONS

Lim et al. (Laser Pruning of Carbon Nanotubes as a route to Static and Movable Structures. Adv Mat, 15(3), pp. 300-30 3, Feb. 5, 2003).*

* cited by examiner

METHOD FOR MAKING A CARBON NANOTUBE SLURRY

CROSS-REFERENCE TO RELATED APPLICATIONS

This application claims all benefits accruing under 35 U.S.C. §119 from China Patent Application No. 201110097647.7, filed on Apr. 19, 2011 in the China Intellectual Property Office, the disclosure of which is incorporated herein by reference. This application is related to applications entitled, "METHOD FOR MAKING CARBON NANOTUBE SLURRY", filed on Aug. 16, 2011 as U.S. application Ser. No. 13/210,405.

BACKGROUND

1. Technical Field

The present disclosure relates to a method for making carbon nanotube slurry.

2. Description of Related Art

A field emission cathode is an important element for a field emission device. A field emission cathode is usually made by printing a cathode slurry including a plurality of electron emitters on a cathode conductive layer and exposing the electron emitters from the cathode slurry.

Carbon nanotubes (CNT) are very small tube-shaped structures, and have extremely high electrical conductivity, very diameters, and a tip-surface area near the theoretical limit. Thus, carbon nanotubes can transmit an extremely high electrical current and be used as the electron emitters to make the cathode slurry. A Length of carbon nanotubes affects the field emission characteristics of the carbon nanotube slurry. If lengths of carbon nanotubes are too long, the field emission characteristics of the carbon nanotube slurry will be decreased. In the conventional method, long carbon nanotubes are trimmed by a ball milling method. However, the shorten lengths of the carbon nanotubes via the ball milling are not uniform, and this leads to uneven field emission characteristic.

What is needed, therefore, is to provide a method for making the carbon nanotube slurry that can overcome the above-described shortcomings.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
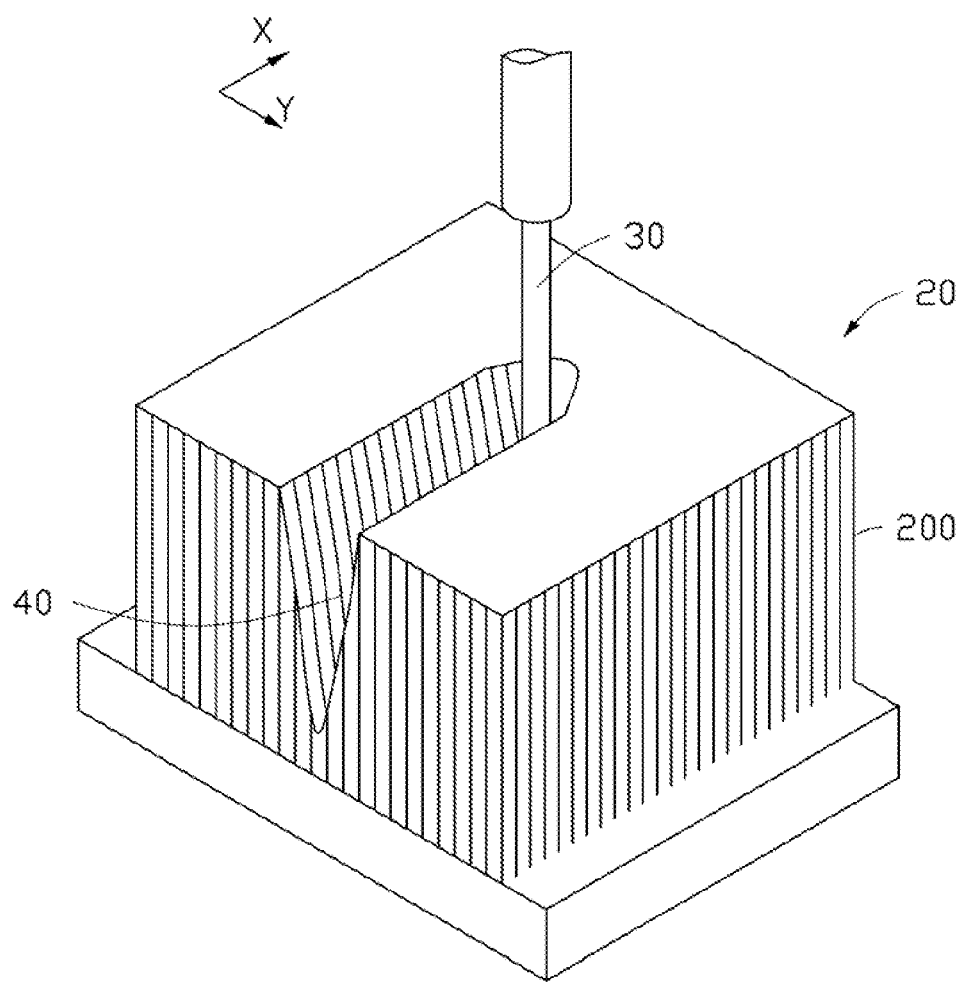
FIG. 1 is a schematic view of one embodiment of a method for trimming the carbon nanotube array.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

References will now be made to the drawings to describe, in detail, various embodiments of the present method for making carbon nanotube slurry.

A method for making carbon nanotube slurry of one embodiment includes the following steps of:

step (100), providing a carbon nanotube array on a substrate, the carbon nanotube array including a plurality of carbon nanotubes;

step (200), trimming the carbon nanotube array by irradiating the carbon nanotube array via a laser to obtain a trimmed carbon nanotube array including a plurality of trimmed carbon nanotubes having uniform lengths;

step (300), removing the trimmed carbon nanotube array from the substrate to obtain the trimmed carbon nanotubes having uniform lengths;

step (400), mixing the trimmed carbon nanotubes with an inorganic binder and an organic carrier to obtain a carbon nanotube slurry.

In step (100), the plurality of carbon nanotubes is arranged substantially along the same growing direction. The carbon nanotubes can be substantially perpendicular to the substrate. Lengths of the carbon nanotubes may not be absolutely equal and the carbon nanotubes may be not absolutely parallel to each other because of growing conditions of the carbon nanotube array cannot be controlled precisely. The carbon nanotube array can be a super-aligned carbon nanotube array. The carbon nanotubes can be single-walled carbon nanotubes, double-walled carbon nanotubes, or multi-walled carbon nanotubes. In one embodiment, the super-aligned carbon nanotube array is prepared by a chemical vapor deposition method. The super-aligned carbon nanotube array can be approximately 100 micrometers (μm) to 400 μm in length and includes a plurality of carbon nanotubes substantially parallel to each other and substantially perpendicular to the substrate. The super-aligned carbon nanotube array is essentially free of impurities, such as carbonaceous or residual catalyst particles. The carbon nanotubes in the super-aligned carbon nanotube array are packed together closely by van der Waals attractive force.

In one embodiment, the super-aligned array of carbon nanotubes can be formed by the substeps of: (a1) providing a substantially flat and smooth substrate; (a2) forming a catalyst layer on the substrate; (a3) annealing the substrate with the catalyst at a temperature in a range from 700° C. to 900° C. in air for about 30 minutes (min) to 90 min; (a4) heating the substrate with the catalyst at a temperature in a range from about 500° C. to about 740° C. in a furnace with a protective gas therein; and (a5) supplying a carbon source gas into the furnace for about 5 min to 30 min, and growing a super-aligned array of the carbon nanotubes from the substrate.

In step (a1): the substrate can be a P-type silicon wafer, an N-type silicon wafer, or a silicon wafer with a film of silicon dioxide thereon. In one embodiment, a 4-inch P-type silicon wafer is used as the substrate. In step (a2): the catalyst can be made of iron (Fe), cobalt (Co), nickel (Ni), or any alloy thereof.

In step (200), when the laser 30 irradiates the carbon nanotube array 20, the direction of the laser 30 is substantially perpendicular to the surface of the carbon nanotube array 20 as shown in FIG. 1. Namely, the direction of the laser 30 is parallel to an axial direction of carbon nanotubes 200 in the carbon nanotube array 20. The laser 30 is produced by a laser device. The laser device may be a solid laser, a liquid laser, a gas laser, or a semi-conductor laser. In one embodiment, the laser device is the solid laser. The laser 30 can also be a pulse laser. As the laser 30 irradiates the carbon nanotube array 20, a laser beam produced by the laser device is focused on a top surface of carbon nanotube array 20 and forms a laser irradiating area, e.g., a circle area, on the carbon nanotube array 20, wherein a diameter of the laser irradiating area can range from about 1 micrometer to about 5 micrometers. When the carbon nanotube array 20 is irradiated by the laser 30, the carbon atoms in the top ends of the carbon nanotubes 200 will be oxidized under a heat produced by the laser 30, and the lengths of the carbon nanotubes 200 will be reduced.

To make the movement modes of the carbon nanotube array 20 and the laser 30 clear, an X direction substantially parallel to the top surface of the carbon nanotube array 20 is defined, and a Y direction substantially perpendicular to the X direction is defined as shown in FIG. 1.

In one embodiment, position of the carbon nanotube array 20 is fixed, the laser 30 is moved relative to the carbon nanotube array 20 along the X direction so a groove 40 can be defined in the carbon nanotube array 20. In another embodiment, position of the laser 30 is fixed, the carbon nanotube array 20 is moved relative to the laser along the X direction so the groove 40 can be defined in the carbon nanotube array 20. The bottom of the groove 40 is composed by a plurality of trimmed carbon nanotubes.

Figure 2:
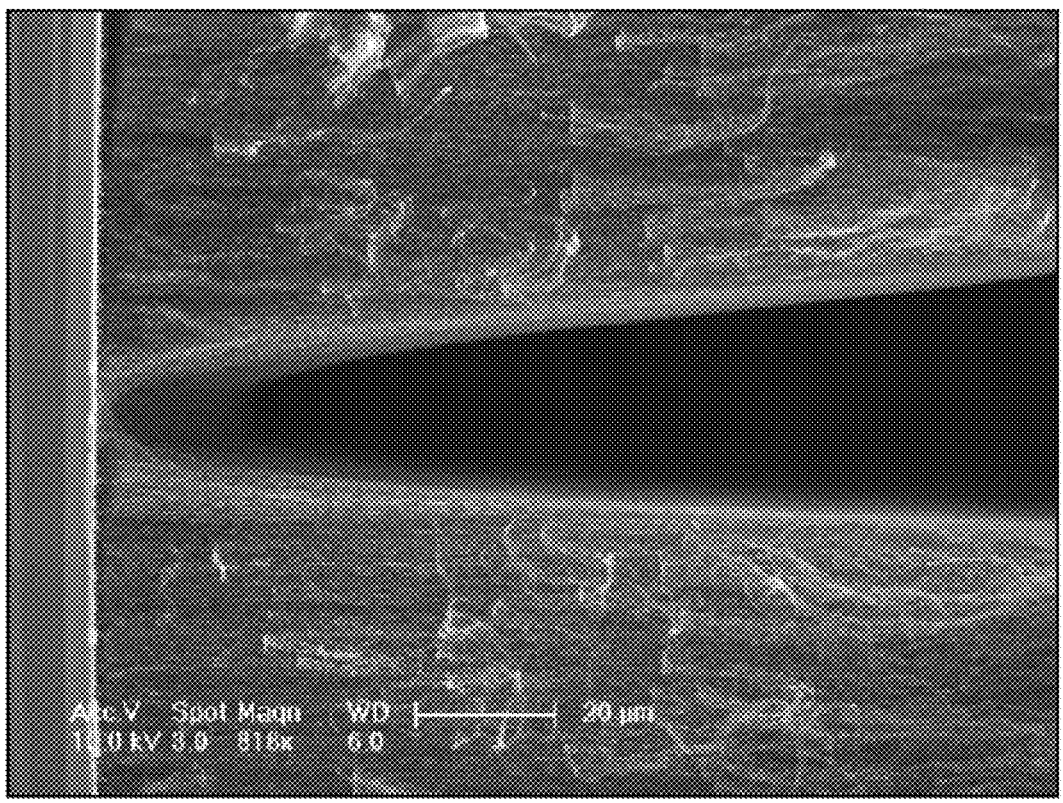
FIG. 2 is a scanning electron microscope (SEM) picture of one embodiment of a carbon nanotube array irradiated by a laser with a power of 3 W, at a speed of 20 millimeters/second (mm/sec).
Figure 3:
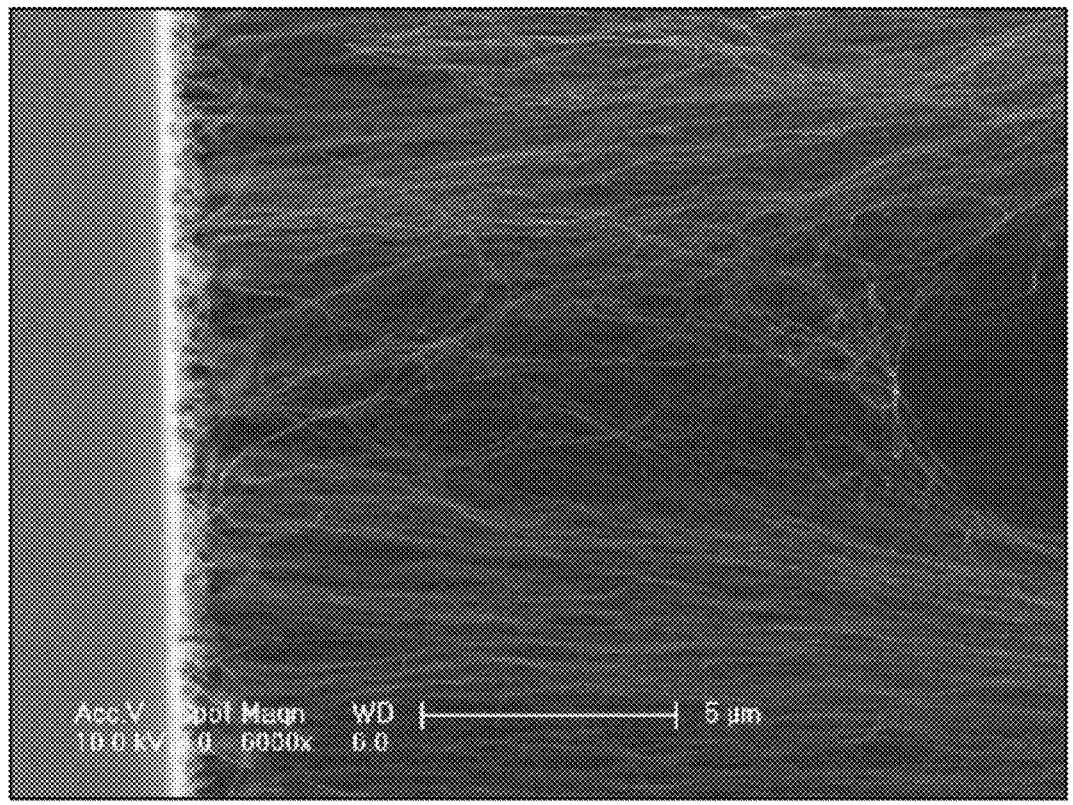
FIG. 3 is a partial enlargement of the SEM picture of FIG. 2.
Figure 4:
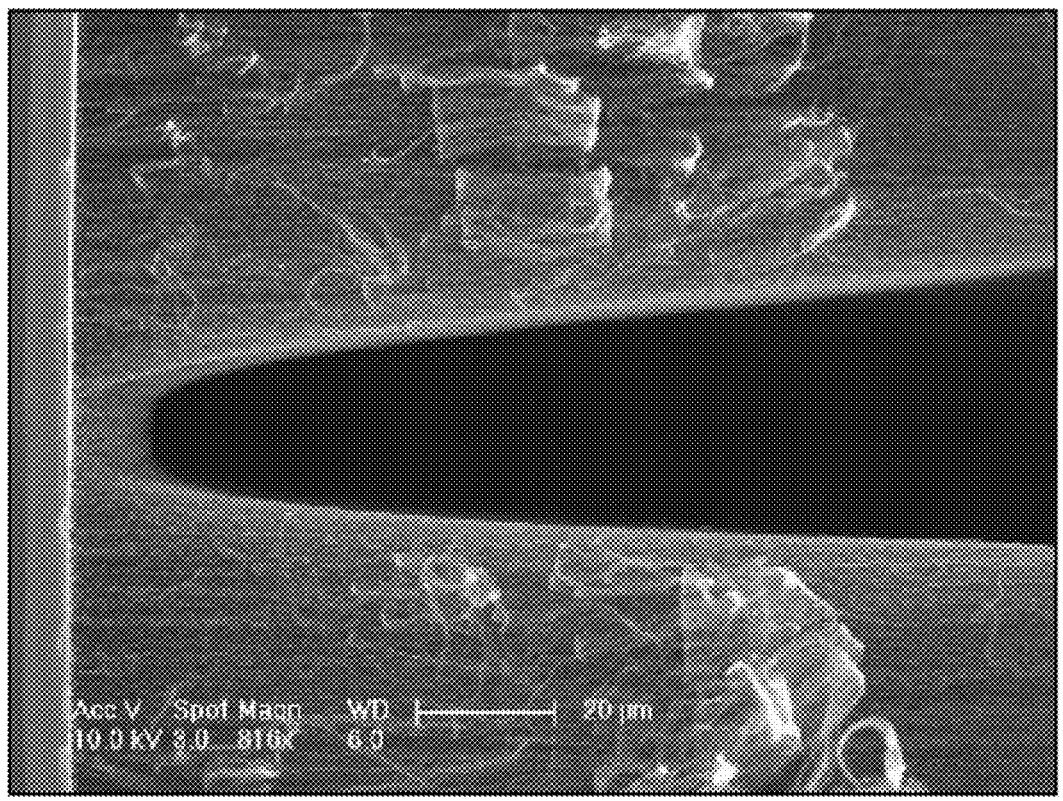
FIG. 4 is a SEM picture of one embodiment of a carbon nanotube array irradiated by a laser with a power of 3.6 W, at a speed of 20 mm/sec.
Figure 5:
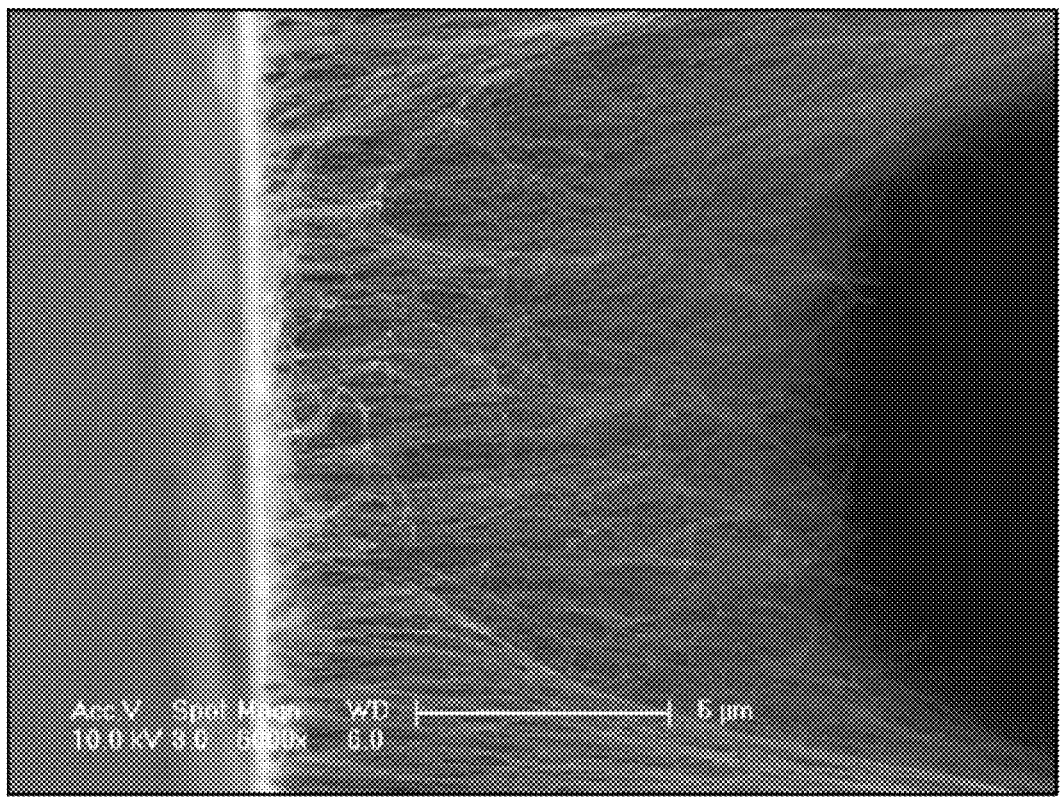
FIG. 5 is a partial enlargement of the SEM picture of FIG. 4.
Figure 6:
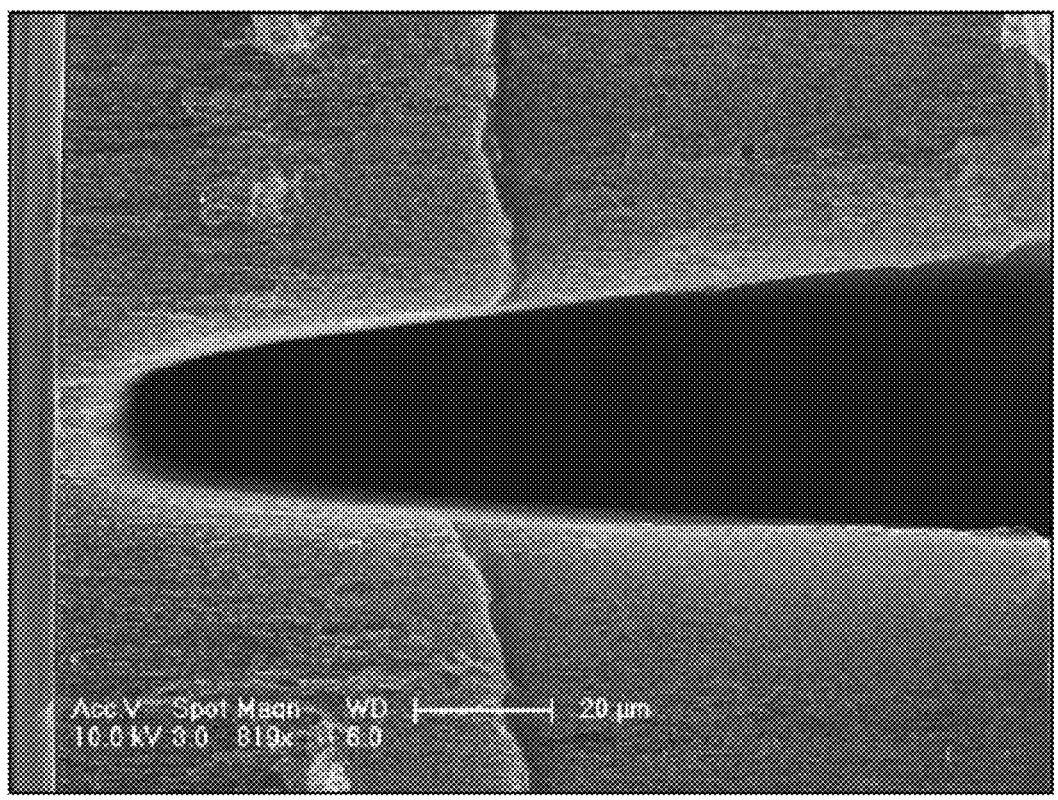
FIG. 6 is a SEM picture of one embodiment of a carbon nanotube array irradiated by a laser with a power of 4.2 W, at a speed of 20 mm/sec.
Figure 7:
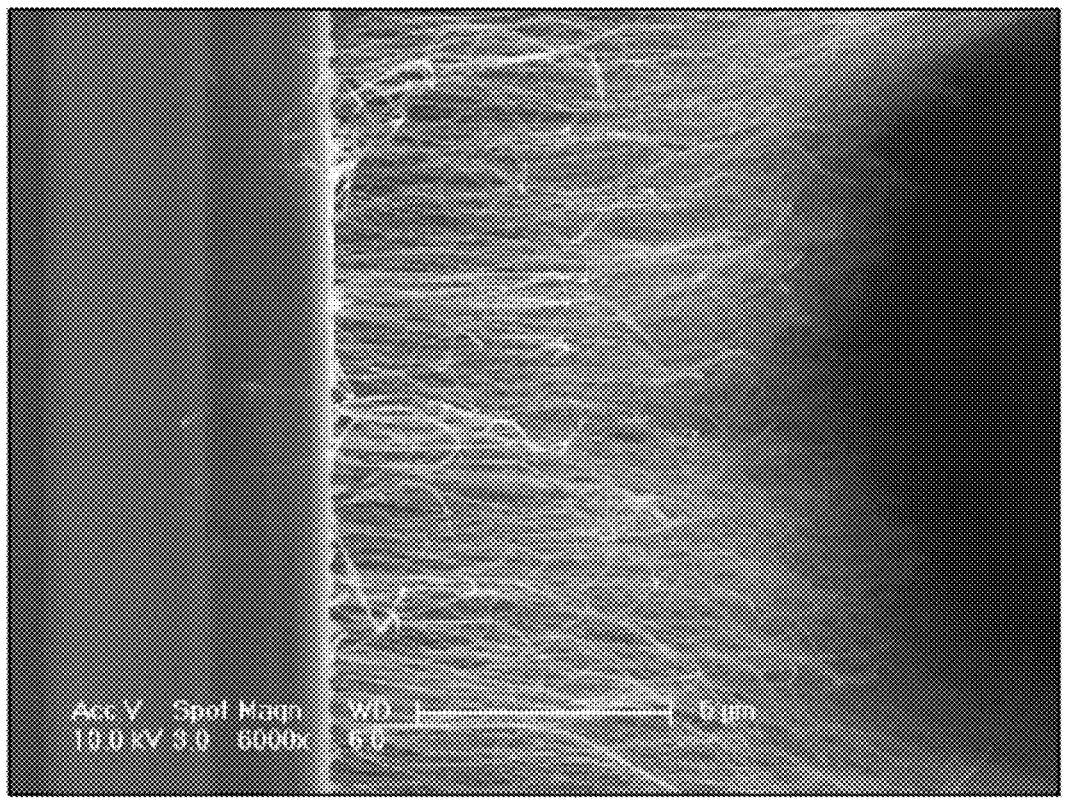
FIG. 7 is a partial enlargement of the SEM picture of FIG. 6.

In one embodiment, the power of the laser 30 is varied and the speed of the laser 30 along the X direction is fixed to 20 mm/sec. Three samples are obtained and shown in table 1. Referring to FIGS. 2-3, when the power of the laser 30 is 3 W, the length of the trimmed carbon nanotubes of sample I are 14 μm, the width of the bottom of the groove 40 is 5 μm. Referring to FIGS. 4-5, when the power of the laser 30 is 3.6 W, the length of the trimmed carbon nanotubes of sample II are 11 μm, the width of the bottom of the groove 40 is 10 μm. Referring to FIGS. 6-7, when the power of the laser 30 is 4.2 W, the length of the trimmed carbon nanotubes of sample III is 9 μm, the width of the bottom of the groove 40 is 13 μm. In conclusion, the lengths of the trimmed carbon nanotubes are decreased and the width of the bottom of the groove 40 is increased with an increase of the power of the laser 30. The power density of the laser 30 is larger than or equal to $12 \times 10^{11}$ watt/m$^2$ and the power of the laser 30 may be greater than 3 W to ensure that the bottom of the groove 40 has a certain width and the trimmed carbon nanotubes have uniform lengths. The power of the laser 30 may be greater than 4.2 W in an alternative embodiment. The power of the laser 30 may be greater than 3.6 W in another embodiment.

TABLE 1

| Sample Number | Laser Speed | Laser Power | Drawings |
|---|---|---|---|
| Sample I | 20 mm/sec | 3 W | FIGS. 2-3 |
| Sample II | 20 mm/sec | 3.6 W | FIGS. 4-5 |
| Sample III | 20 mm/sec | 4.2 W | FIGS. 6-7 |

Figure 8:
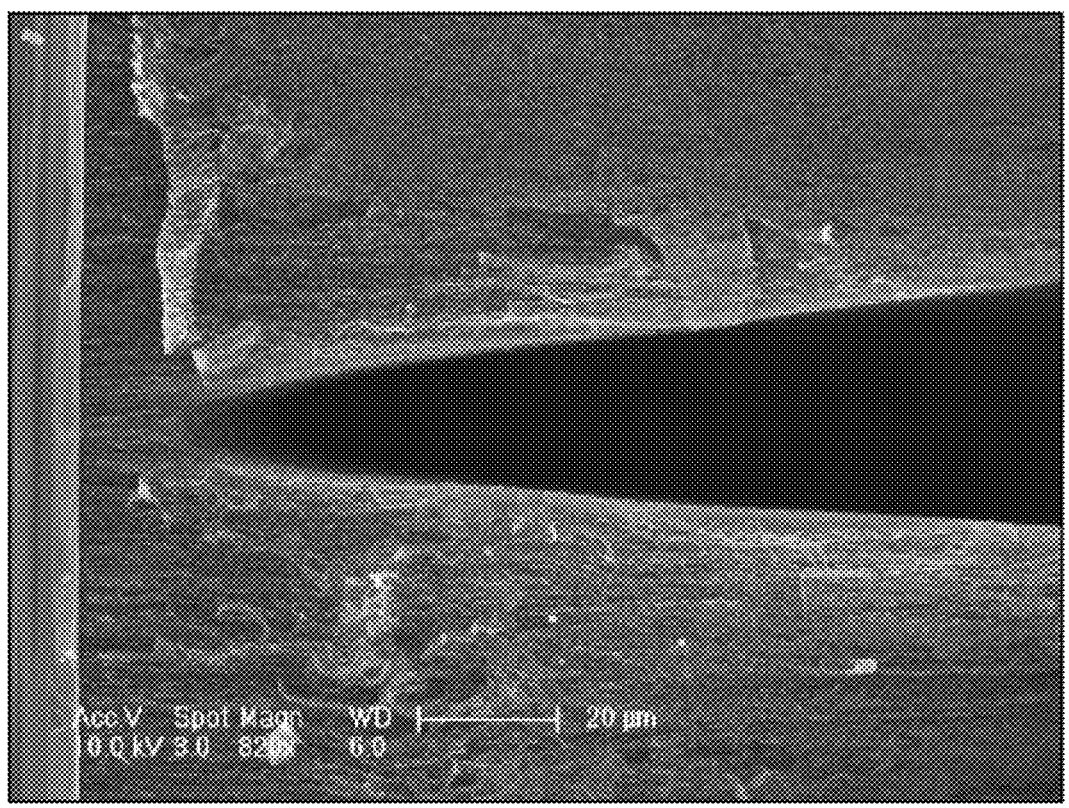
FIG. 8 is a SEM picture of one embodiment of a carbon nanotube array irradiated by a laser with a power of 4.2 W, at a speed of 80 mm/sec.
Figure 9:
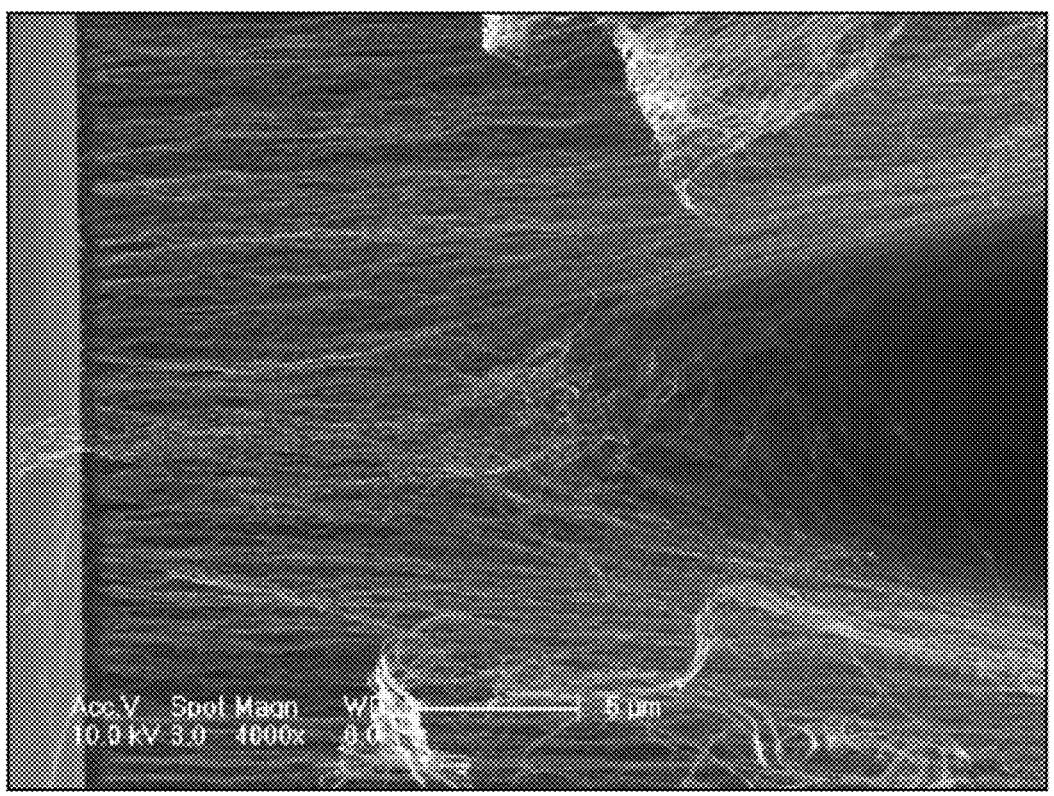
FIG. 9 is a partial enlargement of the SEM picture of FIG. 8.
Figure 10:
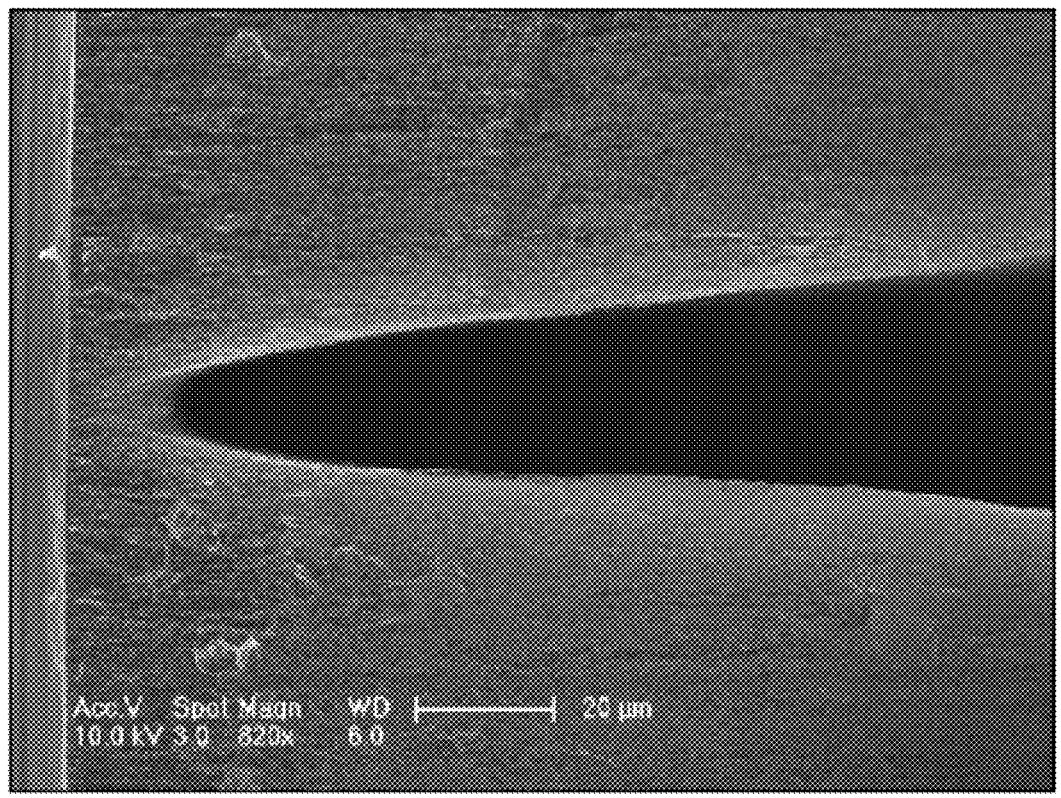
FIG. 10 is a SEM picture of one embodiment of a carbon nanotube array irradiated by a laser with a power of 4.2 W, at a speed of 60 mm/sec.
Figure 11:
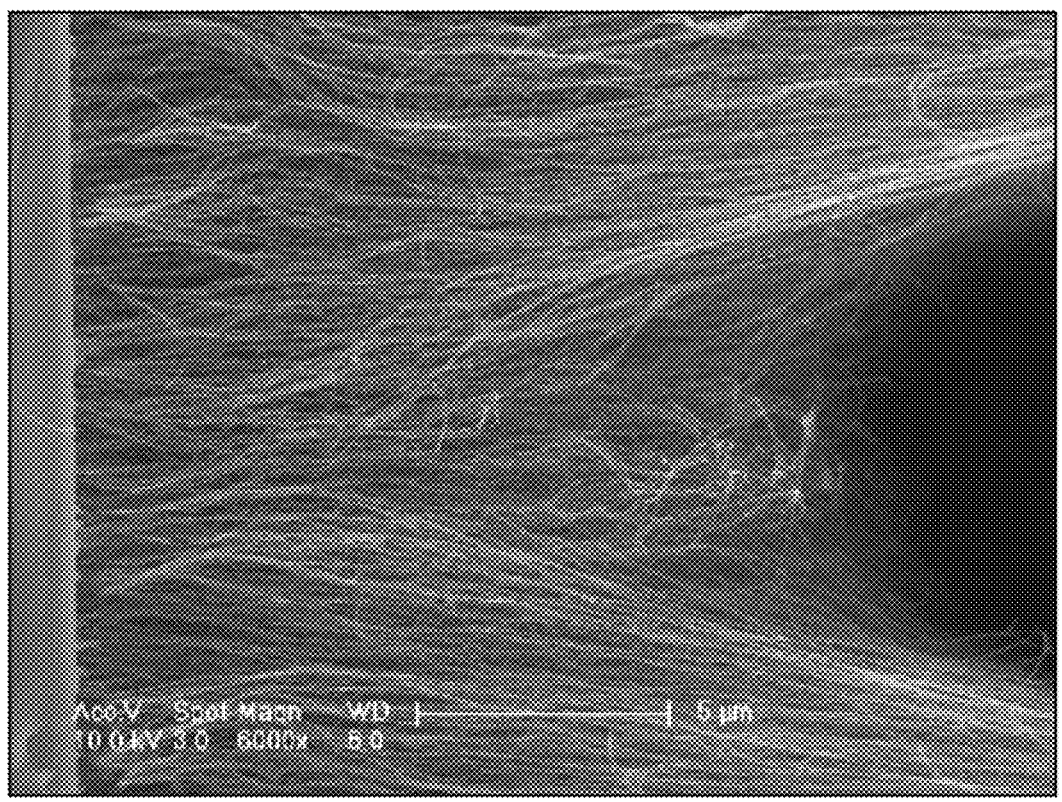
FIG. 11 is a partial enlargement of the SEM picture of FIG. 10.
Figure 12:
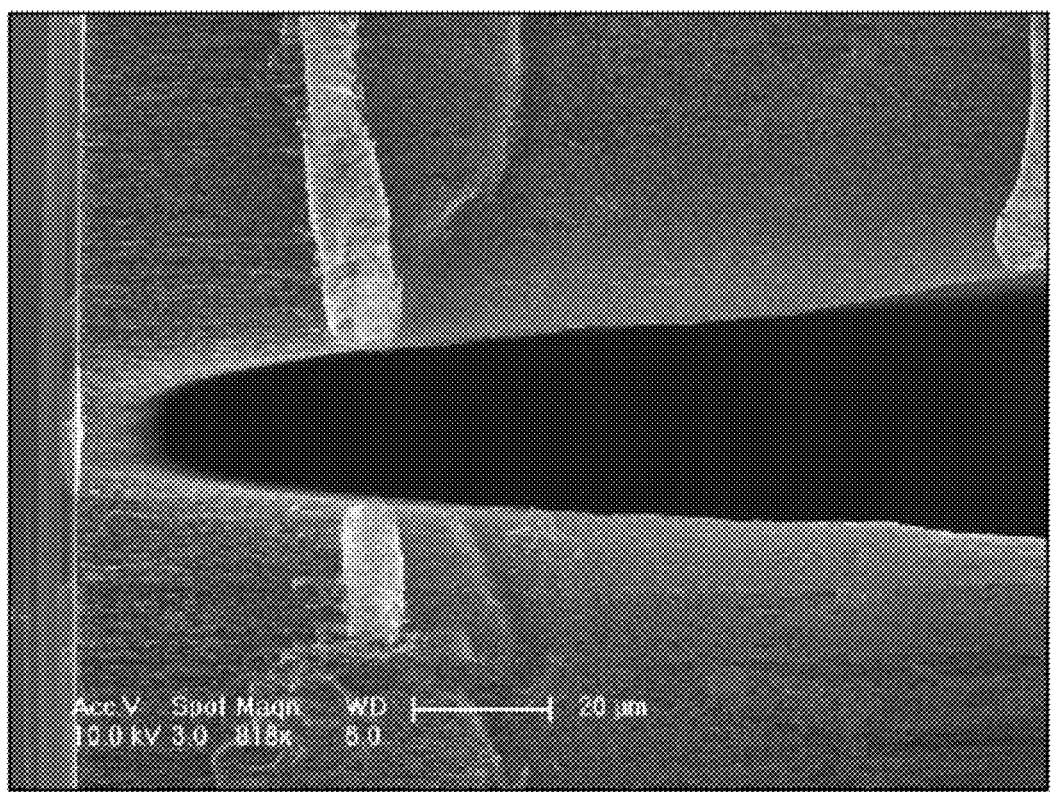
FIG. 12 is a SEM picture of one embodiment of a carbon nanotube array irradiated by a laser with a power of 4.2 W, at a speed of 40 mm/sec.
Figure 13:
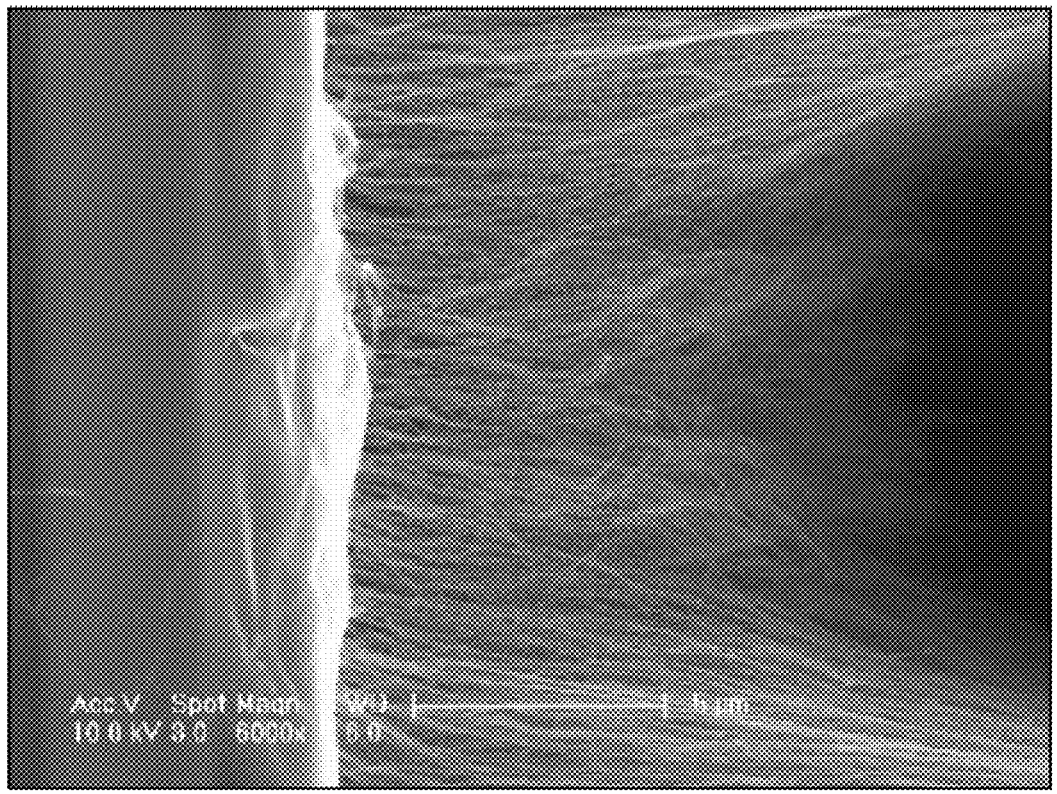
FIG. 13 is a partial enlargement of the SEM picture of FIG. 12.
Figure 14:
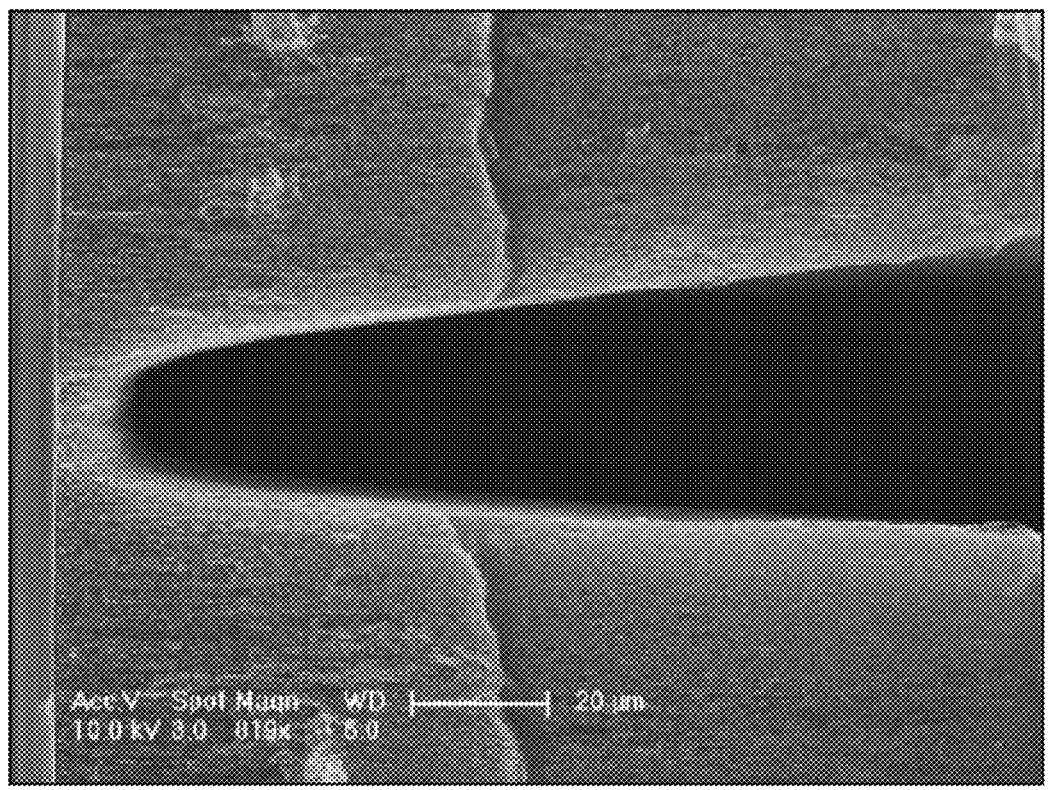
FIG. 14 is a SEM picture of one embodiment of a carbon nanotube array irradiated by a laser with a power of 4.2 W, at a speed of 20 mm/sec.
Figure 15:
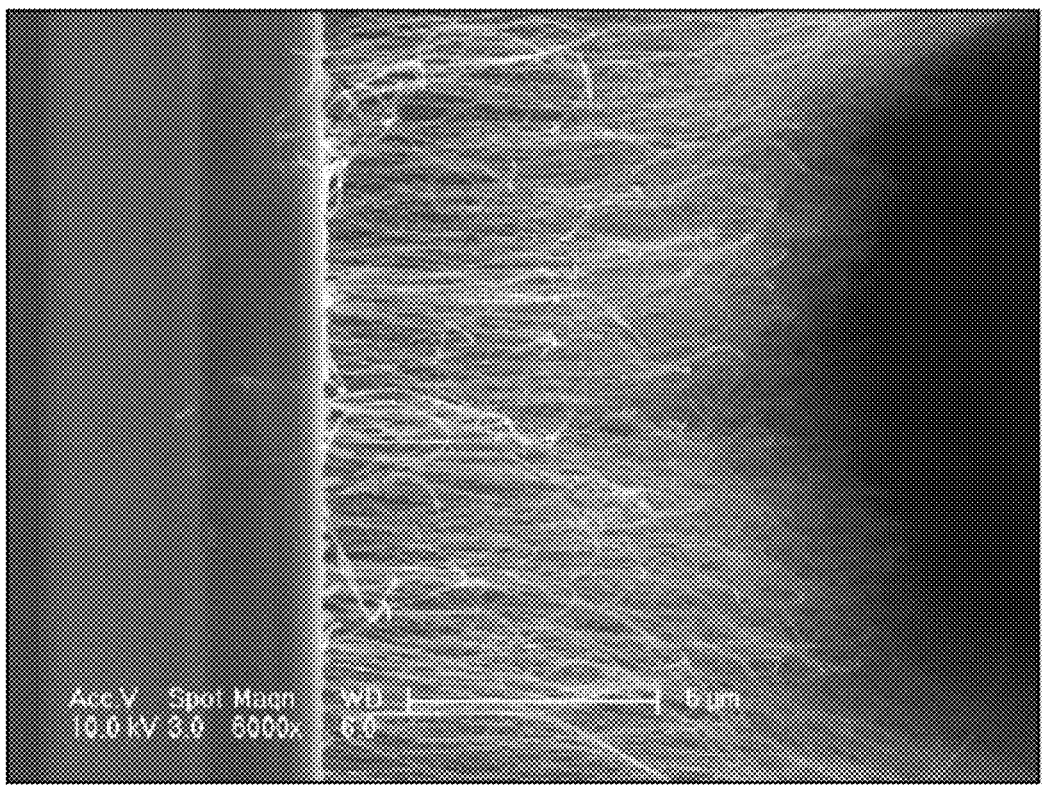
FIG. 15 is a partial enlargement of the SEM picture of FIG. 14.

In one embodiment, the power of the laser 30 is fixed to 4.2 W and the speed of the laser 30 along the X direction is varied. Four samples are obtained and shown in table 2. The speed of the laser 30 is less than 80 mm/sec in one embodiment. The speed of the laser 30 is less than 80 mm/sec but larger than 20 mm/sec in another embodiment. Referring to FIGS. 8-9, when the speed of the laser 30 moving along the X direction is 80 mm/sec, the lengths of the trimmed carbon nanotubes of sample IV are 18 μm, and a width of the bottom of the groove 40 is 10 μm. Referring to FIGS. 10-11, when the speed of the laser 30 moving along the X direction is 60 mm/sec, the lengths of the trimmed carbon nanotubes of sample V are 15 μm, and a width of the bottom of the groove 40 is 7 μm. Referring to FIGS. 12-13, when the speed of the laser 30 moving along the X direction is 40 mm/sec, the lengths of the trimmed carbon nanotubes of sample VI, are 10 μm, and a width of the bottom of the groove 40 is 15 μm. Referring to FIGS. 14-15, when the speed of the laser 30 moving along the X direction is 20 mm/sec, the lengths of the trimmed carbon nanotubes of sample VII, are 8 μm, and a width of the bottom of the groove 40 is 18 μm. Thus, with the decrease of the speed of the laser 30, the lengths of the trimmed carbon nanotubes are decreased and more uniform, the width of the bottom of the groove 40 is increased and a shape of the groove 40 is changed from V-shaped to U-shaped. The U-shaped groove 40 has a flat bottom surface, namely, the length of the trimmed carbon nanotubes are more uniform.

With the decrease of the speed of the laser 30, the carbon nanotubes 200 will absorb more heat produced by the laser 30 per unit time and the carbon nanotubes 200 will be more easily oxidized. Therefore, more carbon atoms of the carbon nanotube array 20 are oxidized per unit time, the length of the trimmed carbon nanotubes are decreased and becomes more uniform, and the shape of the groove 40 is changed from V-shaped to U-shaped. When the carbon nanotube array 20 is irradiated by the laser 30, the carbon nanotubes 200 adjacent to the top surface of the carbon nanotube array 20 have more contact with oxygen in the air compared to the carbon nanotubes 200 away from the top surface of the carbon nanotube array 20. Therefore, the carbon nanotubes 200 adjacent to the top surface of the carbon nanotube array 20 will be more easily oxidized under the heat of the laser 30. Thus, the width of the top of the groove 40 is larger than a width of the bottom of the groove 40.

TABLE 2

| Sample Number | Laser Speed | Laser Power | Drawings |
| --- | --- | --- | --- |
| Sample IV | 80 mm/sec | 4.2 W | FIGS. 8-9 |
| Sample IV | 60 mm/sec | 4.2 W | FIGS. 10-11 |
| Sample VI | 40 mm/sec | 4.2 W | FIGS. 12-13 |
| Sample VII | 20 mm/sec | 4.2 W | FIGS. 14-15 |

Figure 16:
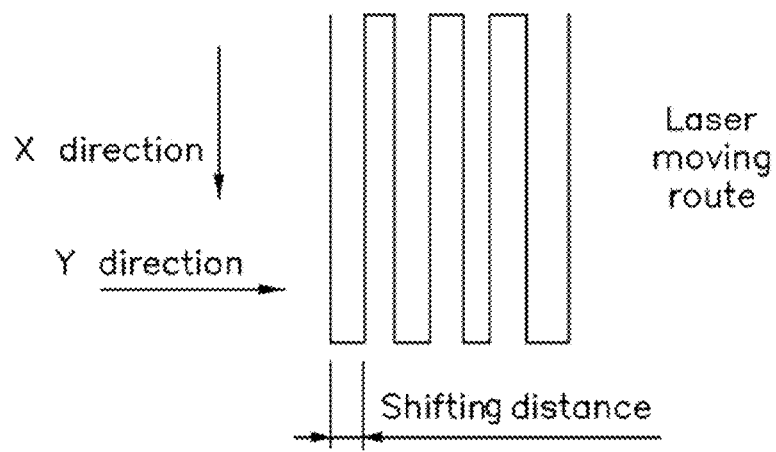
FIG. 16 shows a schematic view of one embodiment of trimming carbon nanotube array with a laser.

In one embodiment, referring to FIG. 16, the method for obtaining the trimmed carbon nanotube array includes the following steps: fixing the position of the carbon nanotube array 20, moving the laser 30 relative to the carbon nanotube array 20 along the X direction which is substantially parallel to the top surface of the carbon nanotube array 20 to obtain a groove 40; moving the laser 30 relative to the carbon nanotube array 20 along the Y direction which is substantially parallel to the top surface of the carbon nanotube array 20; and moving the laser along the X direction and the Y direction alternately to make the laser 30 irradiate the entire carbon nanotube array 20, thus obtaining the trimmed carbon nanotube array.

An angle may defined between the X direction and the Y direction. The speed of the laser 30 along the X direction is less than or equal to 80 mm/sec to ensure that the groove 40 U-shaped. A distance that the laser moving along the Y direction is defined as a shifting distance. The shifting distance may be less than or equal to a width of the bottom of the groove 40 formed in step to ensure that the lengths of the trimmed carbon nanotubes in the trimmed carbon nanotube array are uniform. In one embodiment, the speed of the laser 30 along the Y direction is less than or equal to 80 mm/sec but greater than 20 mm/sec.

In one embodiment, the power of the laser 30 is fixed to 4.2 W, the speed of the laser 30 along the X direction is fixed to 20 mm/sec, and the shifting distance is varied. Four samples are obtained and shown in table 3. Referring to FIGS. 16-19, the lengths of the trimmed carbon nanotubes in the trimmed carbon nanotube array 20 of samples VIII and IX are uniform because the shifting distance which is in a range from about 5 micrometers to about 10 μm, and is less than the width of the bottom of the groove 40 which is 10 μm. Referring to FIGS. 20-23, the lengths of the trimmed carbon nanotubes in the trimmed carbon nanotube array of samples X and XI are not uniform because the shifting distance is in a range from about 15 μm to about 20 μm, and is greater than the width of the bottom of the groove 40 formed in step (202) which is about 10 micrometers.

TABLE 3

Figure 17:
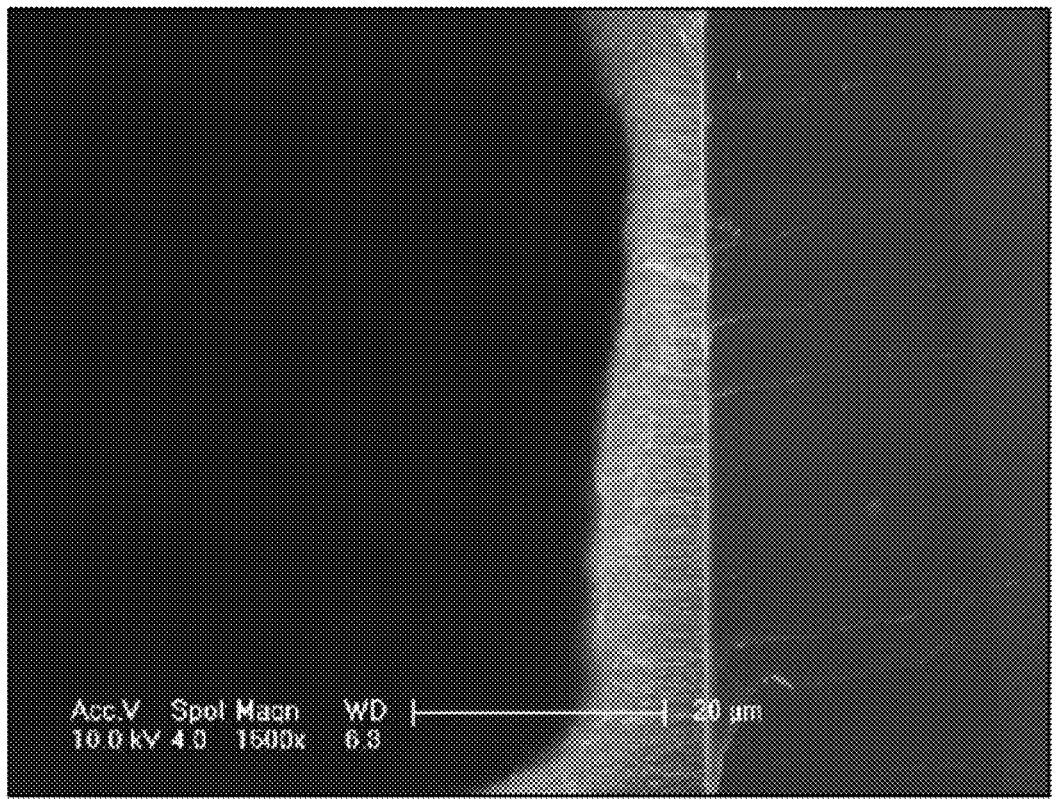
FIG. 17 is a SEM picture of one embodiment of a shorten carbon nanotube array irradiated by a laser with a power of 4.2 W, at a speed of 20 mm/sec, and having a shifting distance of 5 micrometers (μm).
Figure 18:
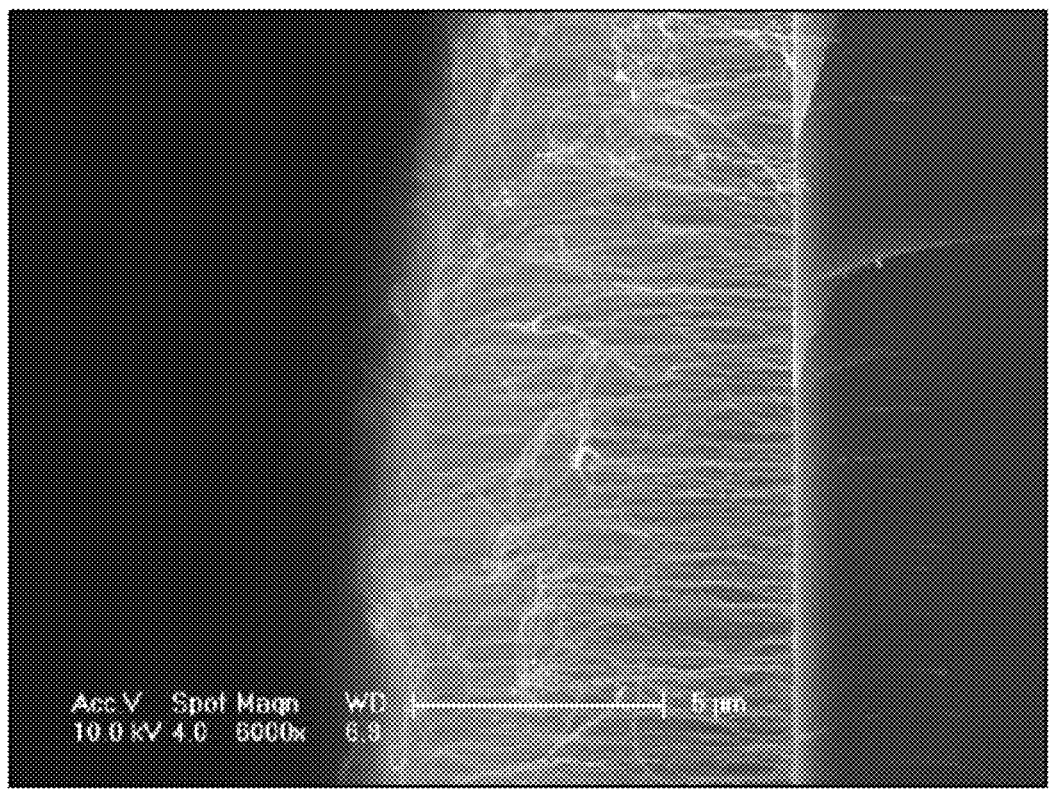
FIG. 18 is a partial enlargement of the SEM picture of FIG. 17.
Figure 19:
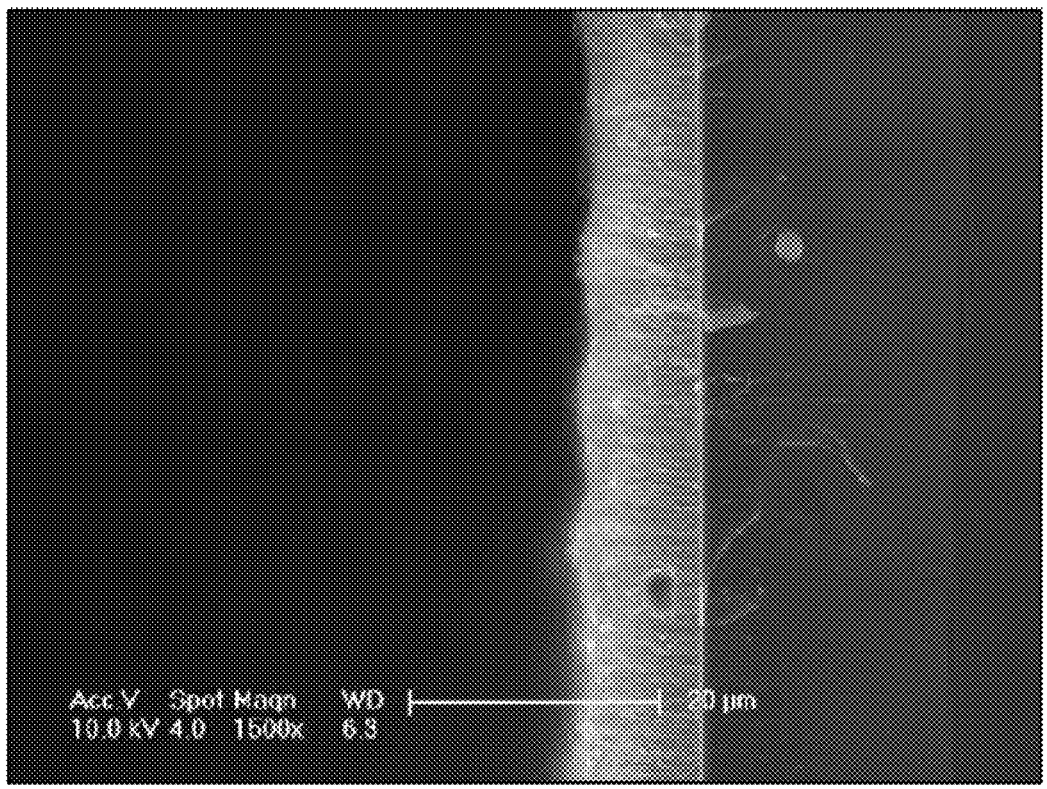
FIG. 19 is a SEM picture of one embodiment of a shorten carbon nanotube array irradiated by a laser with a power of 4.2 W, at a speed of 20 mm/sec, having a shifting distance of 10 μm.
Figure 20:
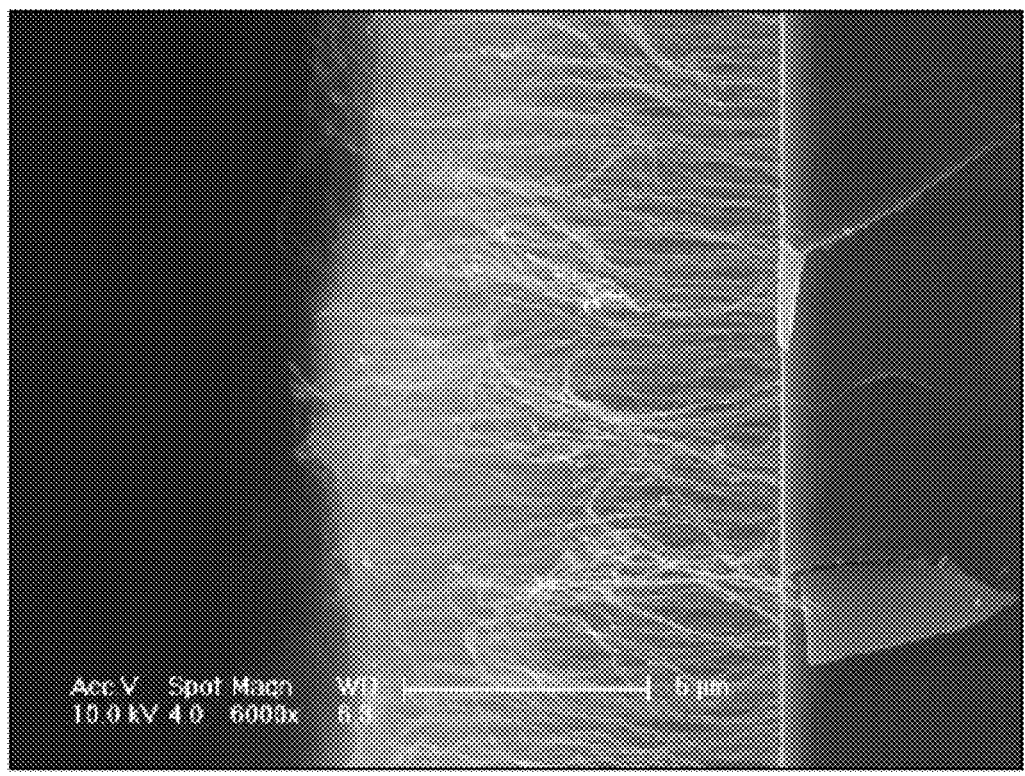
FIG. 20 is a partial enlargement of the SEM picture of FIG. 19.
Figure 21:
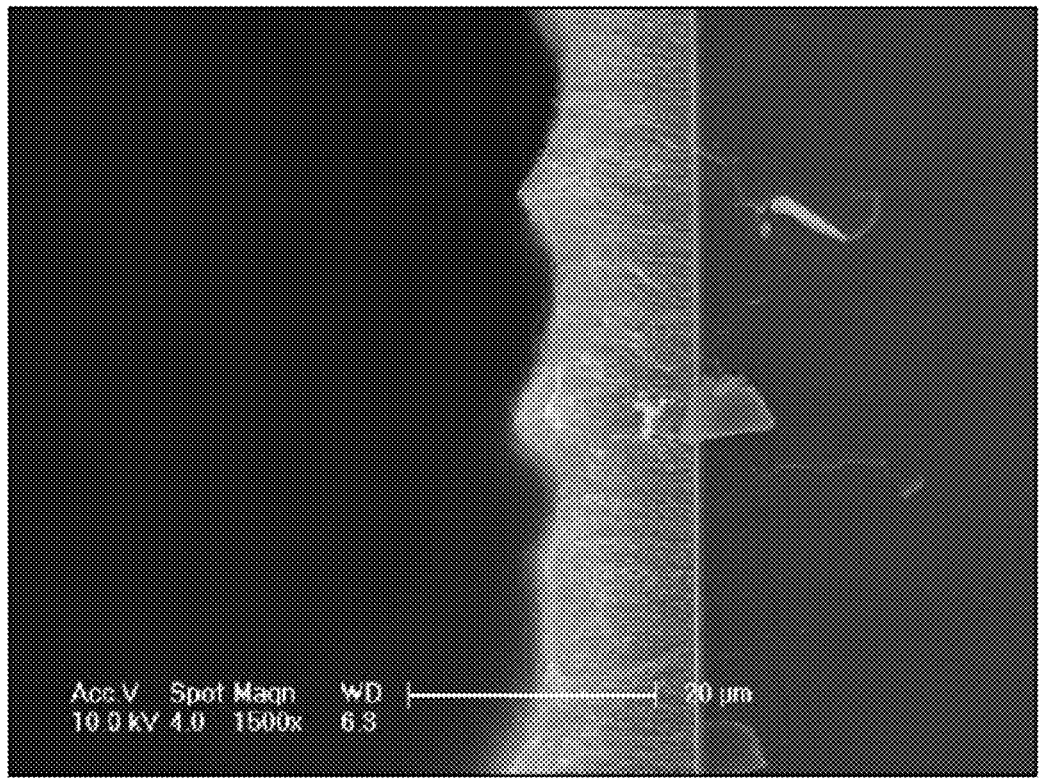
FIG. 21 is a SEM picture of one embodiment of a shorten carbon nanotube array irradiated by a laser with a power of 4.2 W, at a speed of 20 mm/sec, having a shifting distance of 15 μm.
Figure 22:
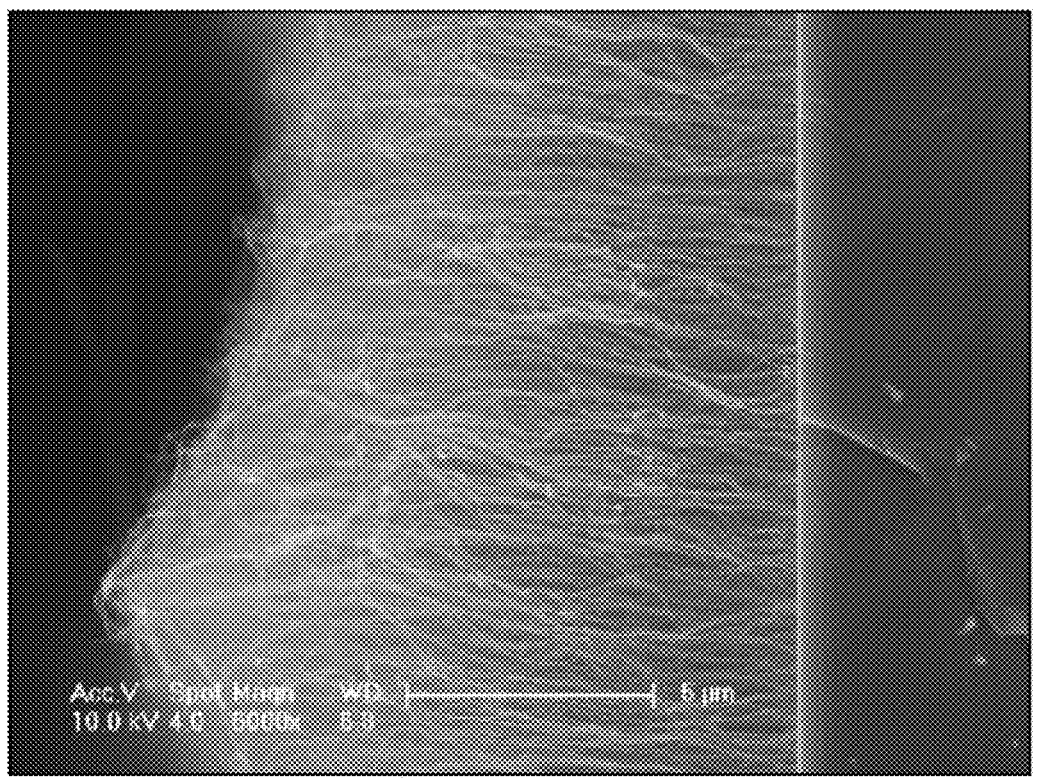
FIG. 22 is a partial enlargement of the SEM picture of FIG. 21.
Figure 23:
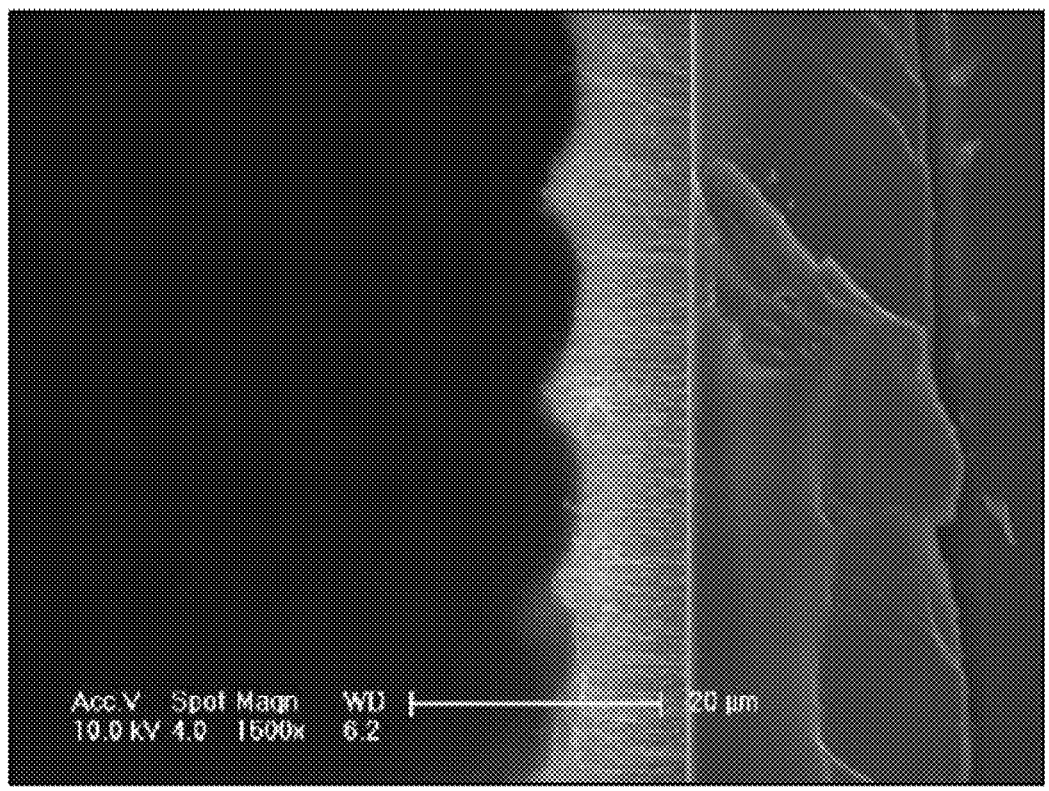
FIG. 23 is a SEM picture of one embodiment of a shorten carbon nanotube array irradiated by a laser with a power of 4.2 W, at a speed of 20 mm/sec, having a shifting distance of 20 μm.

| Sample Number | Laser Speed | Laser Power | Shifting Distance | Drawings |
| --- | --- | --- | --- | --- |
| Sample VIII | 20 mm/sec | 4.2 W | 5 μm | FIGS. 16-17 |
| Sample IX | 20 mm/sec | 4.2 W | 10 μm | FIGS. 18-19 |
| Sample X | 20 mm/sec | 4.2 W | 15 μm | FIGS. 20-21 |
| Sample XI | 20 mm/sec | 4.2 W | 20 μm | FIGS. 22-23 |

Figure 24:
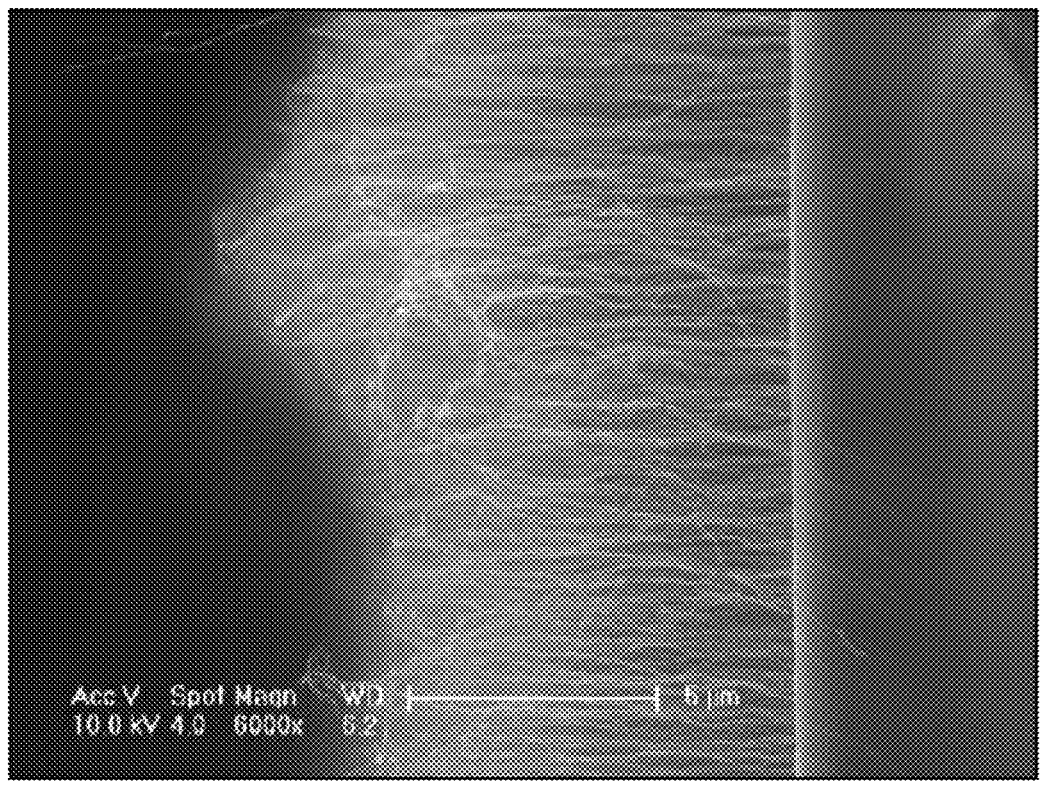
FIG. 24 is a partial enlargement of the SEM picture of FIG. 23.

The trimmed carbon nanotube array includes a plurality of trimmed carbon nanotubes, the lengths of the trimmed carbon nanotubes are in a range from about 1 μm to about 25 μm. Furthermore, the lengths of trimmed carbon nanotubes are uniform, and this means that a length difference between a longest carbon nanotube and a shortest carbon nanotube in the trimmed carbon nanotube array is not greater than 5 μm. In an alternative embodiment, the length difference is in a range from about 2 μm to about 3 μm. In another embodiment, the lengths of the trimmed carbon nanotubes are in a range from about 5 μm to about 10 μm, and the length difference is less than 2 μm. Referring to FIG. 24, the power of the laser is 4.2 W, the speed of the laser is 20 mm/sec, the shifting distance is 8 μm, and the lengths of the trimmed carbon nanotubes are in a range from about 5 μm to about 7 μm.

Figure 25:
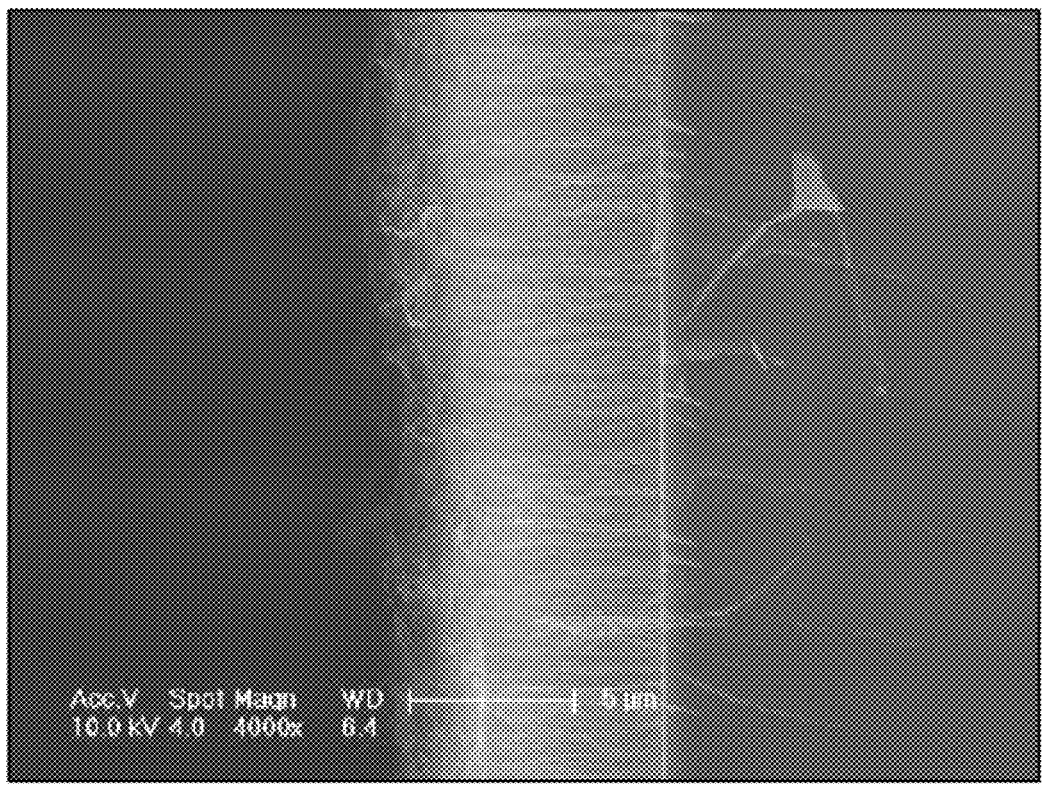
FIG. 25 is a SEM picture of one embodiment of a shorten carbon nanotube array irradiated by a laser with a power of 4.2 W, at a speed of 20 mm/sec, having a shifting distance of 8 μm.

A clearing step can be provided after step (20) but before step (30). Referring to FIG. 25, a plurality of carbon nanotubes not oxidized during the timming process is scattered on a top surface of the trimmed carbon nanotube array. The clearing step can clear out the scattering carbon nanotubes. The clearing step can be executed by blowing nitrogen on the surface or vacuumed using a vacuum device.

In step (30), the trimmed carbon nanotube array can be removed from the substrate by a chemical method or a physical method to obtain the trimmed carbon nanotubes. In one embodiment, the trimmed carbon nanotube array and the substrate can be placed in an organic solvent, and then the trimmed carbon nanotube array can be removed from the substrate by an ultrasonic cell disruptor. The lengths of trimmed carbon nanotubes are in a range from about 7 μm to about 8 μm.

Step (40) includes the following substeps:
step (402), mixing the trimmed carbon nanotubes in a first organic solvent to obtain a first mixed solution;
step (404), mixing the inorganic binder and a plurality of conductive particles in a second organic solvent to obtain a second mixed solution;
step (406), mixing the first mixed solution with the second mixed solution and an organic carrier to form a mixture; and
step (408), removing water from the mixture.
In step (402) and step (404), the first organic solvent and the second organic solvent are ethyl alcohol.

In step (404), the inorganic binder can be a glass powder, silicon dioxide ($SiO_2$) powder or a mixture thereof. The glass powder can be a low melting point glass powder with a melting point in a range from about 300° C. to about 600° C. The effective diameter of the glass powder can be less than or equal to 10 μm. In one embodiment, the effective diameter of the glass powder is less than or equal to 1 micrometer. In another embodiment, the low melting point glass powder is an lead-free low melting point glass powder. The lead-free low melting point glass powder can improve an electrical contact between a cathode and the carbon nanotube slurry. The lead-free low melting point glass powder can also avoid a chemical reaction between the carbon nanotubes and yellow lead (PbO).

The conductive particles can be metal particles, such as indium oxide ($In_2O_3$) powder, tin oxide ($SnO_2$) powder, or tin indium oxide (ITO) powder or a mixture thereof. The metal particles can be made of nickel, silver or cadmium. A diameter of the metal particles is in a range from about 100 nanometers to about 200 nanometers. The conductive particles are optional.

In step (406), the organic carrier is a volatilizable organic material and can be removed by heating. The organic carrier can include a diluent, a stabilizer, and a plasticizer. The diluent can dissolve the stabilizer and allows the carbon nanotube slurry to have liquidity. The diluent can be terpineol. The stabilizer has strong polarity and can combine with the plasticizer to form a network structure or chain structure to enhance the viscosity and plasticity of the carbon nanotube slurry. The stabilizer can be a polymer such as ethyl cellulose. The plasticizer is solvent with a molecular chain having strong polarized groups, and can combine with the stabilizer to form a network structure. The plasticizer can be dibutyl phthalate or dibutyl sebacate. In one embodiment, the plasticizer is dibutyl sebacate with a boiling point of about 344° C. The dibutyl sebacate is very volatilizable and inexpensive. The dibutyl sebacate does not contain a benzene ring and is environmentally safe. Furthermore, the organic carrier can include surfactant, such as Span 40 with a formula of $C_6H_8O(OH)_3OCO(CH_2)_{14}CH_3$ $C_{22}H_{42}O_6$ or Span 60 with a formula of $C_6H_8O(OH)_3OCO(CH_2)_{16}CH_3$ $C_{24}H_{46}O_6$.

It is to be understood that a photosensitive organic carrier can be obtained by adding photosensitive material into the organic carrier. The photosensitive material can be composed of a reactive diluent, a low-grade polymer or an evocating agent. The reactive diluent may be an isobornyl methacrylate (IBOA) having a low cure shrinkage (8.2%). The low-grade polymer may be a urethane acrylate (PUA). The urethane acrylate has a bifunctional group and a low cure shrinkage (3%-5%). The evocating agent can be a mixture of a benzophenone and a 1-Hydroxycyclohexyl phenyl ketone. The weight percentage of the IBOA in the photosensitive material is 35%. The weight percentage of the PUA in the photosensitive material is 60%. The weight percentage of the evocating agent in the photosensitive material is 5%.

In step (408), the organic carrier can be removed by a heating method. After the organic carrier is removed, the weight percentage of the components in the carbon nanotube slurry for carbon nanotubes are in a range from 5% to 15%, the silver powder is in a range from 10% to 20%, the lead-free low melting point glass powder is 5% and the photosensitive organic carrier is in a range from 60% to 80%. If contents of the carbon nanotubes and the lead-free low melting point glass powder in the carbon nanotube slurry are too high, the viscosity of the carbon nanotube slurry will be large and the liquidity of the carbon nanotube slurry will be poor. The carbon nanotube slurry will be stuck and the image will be unclear after screen painting. If the contents of the carbon nanotubes and the lead-free low melting point glass powder in the carbon nanotube slurry are too low, a plasticity of the carbon nanotube slurry will be poor. The carbon nanotube slurry will not be easy to take shape during screen painting. Thus, a plurality of holes will exist in the image after screen painting.

Step (40) can also be executed by the following substeps: mixing the organic solvent, the inorganic binder, the conductive particles and the organic carrier to obtain a mixture; and removing water from the mixture.

Figure 26:
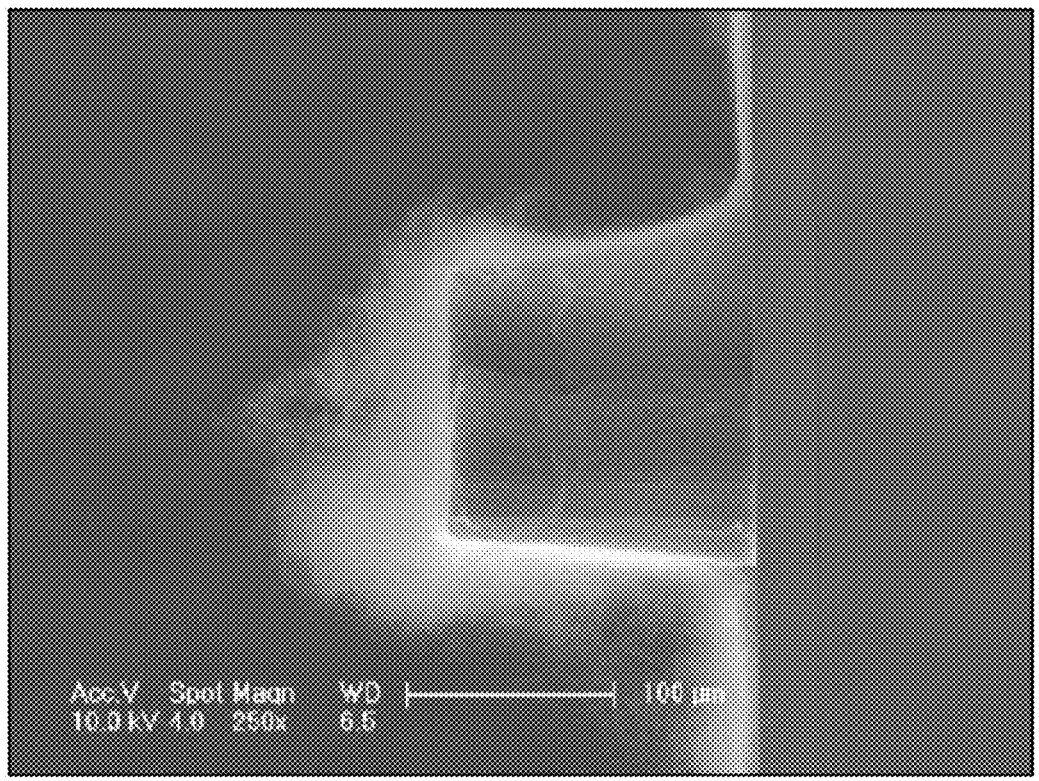
FIG. 26 is a SEM picture of one embodiment of a carbon nanotube array during a trimming process.
Figure 27:
FIG. 27 is a SEM picture of one embodiment of an improved carbon nanotube slurry.
Figure 28:
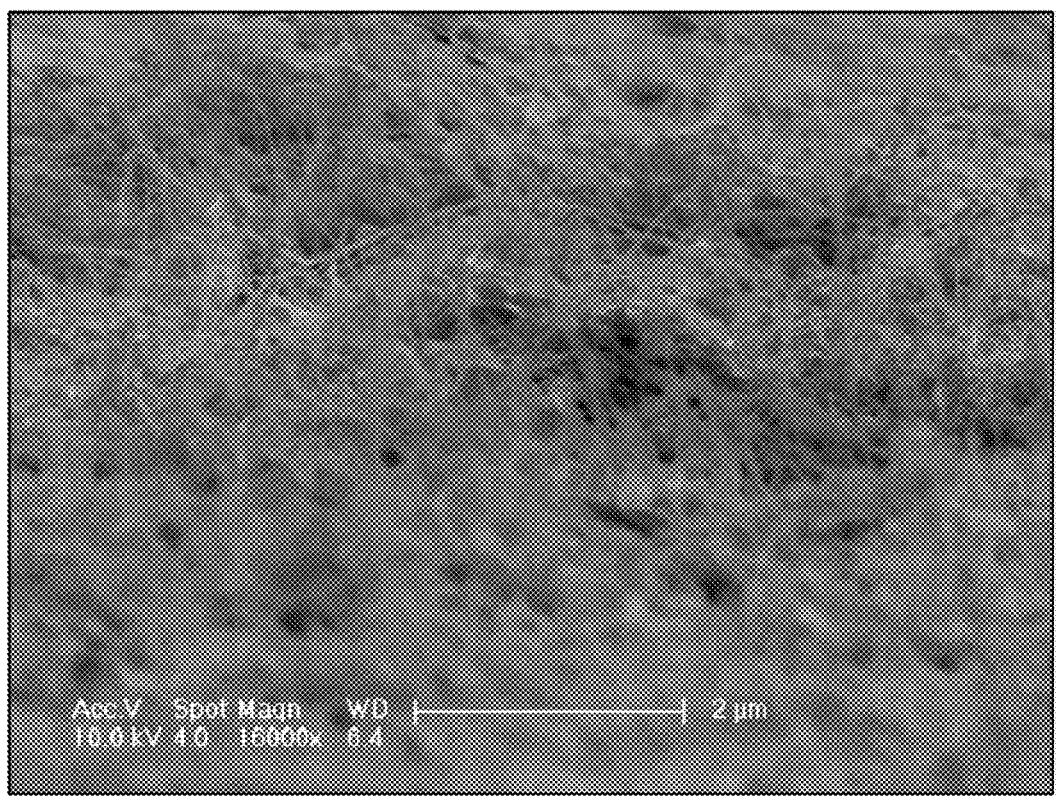
FIG. 28 is a SEM picture of a non-uniform length carbon nanotube slurry.
Figure 29:
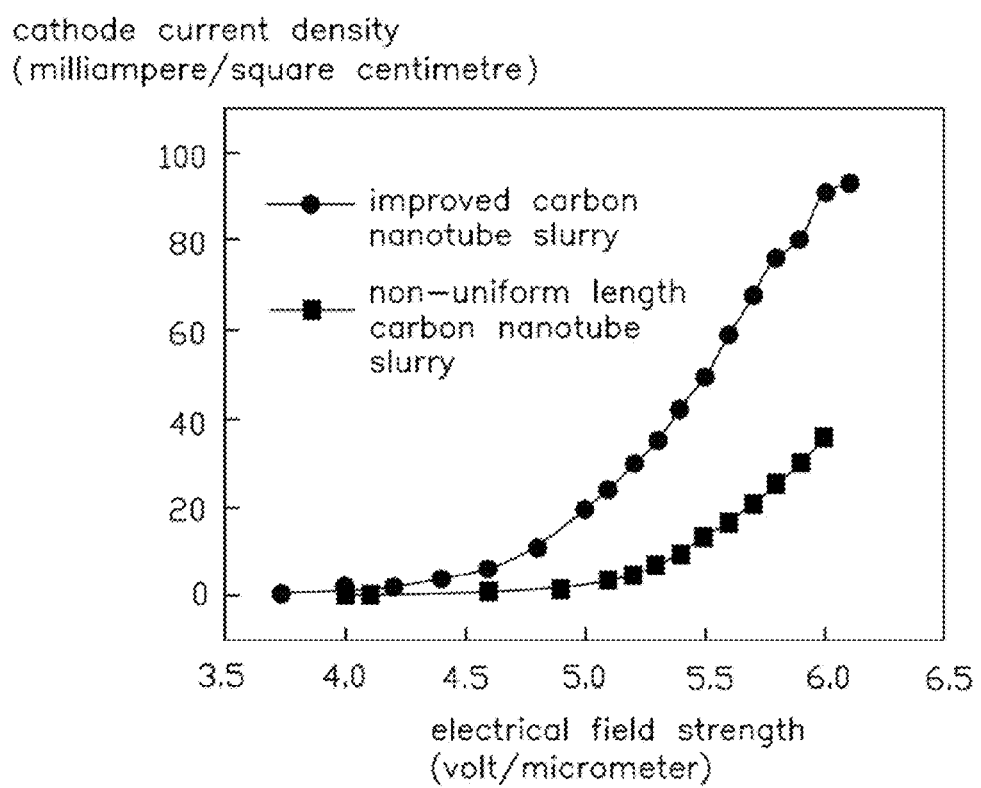
FIG. 29 shows the field emission characteristics of the carbon nanotube slurry of FIG. 28 and the improved carbon nanotube slurry of FIG. 27.

Referring to FIG. 26, the carbon nanotube slurry in FIG. 26 is made of trimmed carbon nanotubes and the lengths of the trimmed carbon nanotubes are in a range from about 5 μm to about 7 μm. The carbon nanotube slurry in FIG. 26 can be defined as an improved carbon nanotube slurry. Referring to FIG. 27, the carbon nanotube slurry is made of not being uniform lengths carbon nanotubes and the lengths of carbon nanotubes are in a range from about 100 μm to about 400 μm. The carbon nanotube slurry in FIG. 27 is named as non-uniform length carbon nanotube slurry. The weight percentage of the carbon nanotubes in the non-uniform length carbon nanotube slurry is equal to that of the improved carbon nanotube slurry. Referring to FIGS. 26 and 27, carbon nanotubes exposed from the non-uniform length carbon nanotube slurry is fewer than that of the improved carbon nanotube slurry because the lengths of the carbon nanotubes are longer than the lengths of the trimmed carbon nanotubes. Therefore, the electrical shielding of the carbon nanotubes in the non-uniform length carbon nanotube slurry may be stronger than that of the improved carbon nanotube slurry. Referring to FIG. 28, the current density of the non-uniform length carbon nanotube slurry is greater than that of the improved carbon nanotube slurry if an electrical field strength is applied to the non-uniform length carbon nanotubes slurry and the improved carbon nanotube slurry respectively.

It is to be understood that the above-described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A method for making carbon nanotube slurry, the method comprising:
providing a carbon nanotube array on a substrate, the carbon nanotube array comprising a plurality of carbon nanotubes;
trimming the carbon nanotube array by a laser to obtain a trimmed carbon nanotube array, wherein the entire carbon nanotube array on the substrate is trimmed, and the trimmed carbon nanotube array has a plurality of trimmed carbon nanotubes having substantially uniform lengths, wherein a power density of the laser is larger than or equal to $12 \times 10^{11}$ watt/m$^2$;

removing the trimmed carbon nanotube array from the substrate to obtain the trimmed carbon nanotubes having the substantially uniform lengths; and mixing the trimmed carbon nanotubes with an inorganic binder and an organic carrier to obtain a carbon nanotube slurry wherein the step of trimming the carbon nanotube array by the laser comprises:

fixing the position of the carbon nanotube array, moving the laser relative to the carbon nanotube array along a first direction which is substantially parallel to the top surface of the carbon nanotube array to obtain a groove;

moving the laser relative to the carbon nanotube array along a second direction which is substantially parallel to the top surface of the carbon nanotube array; and moving the laser along the first direction and the second direction alternately to make the laser irradiate the entire carbon nanotube array, wherein the first direction is intersected with the second direction.

2. The method of claim 1, wherein the carbon nanotubes are parallel to each other and perpendicular to a surface of the substrate.

3. The method of claim 1, wherein the laser irradiates the carbon nanotube array along a direction parallel to an axial direction of the carbon nanotubes in the carbon nanotube array.

4. The method of claim 1, wherein lengths of the trimmed carbon nanotubes are in a range from about 1 micrometer to about 25 micrometers.

5. The method of claim 4, wherein the lengths of the trimmed carbon nanotubes are in a range from about 5 micrometers to about 10 micrometers.

6. The method of claim 1, wherein a length difference between a longest carbon nanotube and a shortest carbon nanotube in the trimmed carbon nanotube array is less than or equal to 5 micrometers.

7. The method of claim 6, wherein the length difference between the longest carbon nanotube and the shortest carbon nanotube in the trimmed carbon nanotube array is in a range from about 2 micrometers to about 3 micrometers.

8. The method of claim 7, wherein a power of the laser is greater than 3 watts.

9. The method of claim 8, wherein the power of the laser is greater than 4.2 watts.

10. The method of claim 1, wherein the laser is a pulse laser.

11. The method of claim 1, wherein a speed of the laser moving along the first direction is less than or equal to 80 mm/sec.

12. The method of claim 11, wherein the speed of the laser moving along the first direction is less than or equal to 80 mm/sec and greater than or equal to 20 mm/sec.

13. The method of claim 1, wherein the second direction is perpendicular to the first direction.

14. The method of claim 1, wherein a shifting distance of the laser along the second direction is greater than 5 micrometers.

15. The method of claim 14, wherein the shifting distance is greater than 5 micrometers and less than or equal to 20 micrometers.

16. The method of claim 1, wherein a power of the laser is about 4.2 W, a speed of the laser moving along the first direction is about 20 mm/sec, a shifting distance of the laser moving along the second direction is about 8 μm.

17. The method of claim 1, wherein a shifting distance of the laser moving along the second direction after the laser moving along the first direction is greater than a width of the groove.

* * * * *